United States Patent
Youn et al.

(10) Patent No.: US 11,604,950 B2
(45) Date of Patent: Mar. 14, 2023

(54) METHODS AND APPARATUSES FOR CLASSIFYING DATA POINT USING CONVEX HULL BASED ON CENTROID OF CLUSTER

(71) Applicant: RESEARCH & BUSINESS FOUNDATION SUNGKYUNKWAN UNIVERSITY, Suwon-si (KR)

(72) Inventors: Hee Yong Youn, Seongnam-si (KR); Byung Jun Lee, Suwon-si (KR); Kyung Tae Kim, Suwon-si (KR); Pardis Birzhandi, Seoul (KR); Min Woo Kim, Suwon-si (KR); Tae Ho Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 76 days.

(21) Appl. No.: 17/145,643

(22) Filed: Jan. 11, 2021

(65) Prior Publication Data

US 2021/0216832 A1 Jul. 15, 2021

(30) Foreign Application Priority Data

Jan. 13, 2020 (KR) ........................ 10-2020-0004440

(51) Int. Cl.
*G06K 9/62* (2022.01)
*G06N 20/10* (2019.01)

(52) U.S. Cl.
CPC ......... *G06K 9/6272* (2013.01); *G06K 9/6259* (2013.01); *G06K 9/6276* (2013.01); *G06N 20/10* (2019.01)

(58) Field of Classification Search
None
See application file for complete search history.

(56) References Cited

U.S. PATENT DOCUMENTS

| | | | |
|---|---|---|---|
| 6,122,628 A | * | 9/2000 | Castelli ................ G06K 9/6272 707/999.005 |
| 9,740,368 B1 | * | 8/2017 | Love .................. G06F 3/04817 |

(Continued)

OTHER PUBLICATIONS

Korean Notice of Allowance dated Mar. 16, 2021 in counterpart Korean Patent Application No. 10-2020-0004440 (2 pages in Korean).

*Primary Examiner* — Tahmina N Ansari
(74) *Attorney, Agent, or Firm* — NSIP Law

(57) ABSTRACT

The present disclosure relates to a method and an apparatus for classifying data points using convex hulls based on centroids of clusters, and a method for classifying data points according to one embodiment of the present disclosure comprises clustering data points into a plurality of clusters; constructing a hyperplane by using a set of centroids of singular clusters having a single class label from the plurality of clusters and removing singular clusters whose centroids are not used to construct the hyperplane; generating a convex hull for a singular cluster used to construct the hyperplane; removing internal data points except for the vertices of the generated convex hull from the singular cluster whose centroid is used to construct the hyperplane; and classifying a set of remaining data points except for the removed internal data points among the plurality of clusters.

20 Claims, 26 Drawing Sheets

(56) References Cited

U.S. PATENT DOCUMENTS

| | | | |
|---|---|---|---|
| 2019/0019345 A1* | 1/2019 | Chentanez | G06T 19/20 |
| 2020/0193552 A1* | 6/2020 | Turkelson | G06K 9/6232 |
| 2021/0216832 A1* | 7/2021 | Youn | G06N 20/10 |

* cited by examiner

- ■ : Class-1
- ○ : Class-2
- △ : Centroid of cl(S)
- Ⓐ : Cent(SV)
- ⬭ : Cl(S)
- ⬭ : Cl(M)
- —— : Initial hyperplane
- ---- : Safety margin

FIG. 14

| Data | Number of clusters | | | |
|---|---|---|---|---|
| | 50 | 100 | 150 | 200 |
| Data set-1 | 21011 | 12143 | 6110 | 4889 |
| Data set-2 | 54750 | 29030 | 18112 | 1881 |

METHODS AND APPARATUSES FOR CLASSIFYING DATA POINT USING CONVEX HULL BASED ON CENTROID OF CLUSTER

CROSS-REFERENCE TO RELATED APPLICATIONS

This application claims priority to Korean Patent Application No. 10-2020-0004440 filed on Jan. 13, 2020 in Korea, the entire contents of which are hereby incorporated by reference in their entirety.

BACKGROUND OF THE DISCLOSURE

Field of the Disclosure

The present disclosure relates to a method and an apparatus for classifying data points using convex hulls based on centroids of clusters.

Related Art

Wireless sensor networks enable efficient data collection and transfer in the Internet of Things (IoT) environment. Also, Support Vector Machine (SVM) is an efficient machine learning technique widely used for various classification problems due to its excellent robustness.

However, as the amount of training data increases exponentially, the training time greatly increases. As a result, performance of SVM deteriorates considerably. In other words, SVM exhibits a problem that it is not suitable for solving a problem involving a large-scale data set.

SUMMARY

The embodiments of the present disclosure are intended to provide a method and an apparatus for classifying data points using convex hulls based on centroids of clusters, which may reduce training time considerably by classifying a large-scale data set in an efficient manner.

The embodiments of the present disclosure are intended to provide a method and an apparatus for classifying data points using convex hulls based on centroids of clusters, which may remove duplicate training data in an effective manner by combining support vector clusters and convex hulls and reducing the training time of an SVM in two phases.

However, the technical problem to be solved by the present disclosure is not limited to the above but may be extended to other various problems as long as the extension does not depart from the technical principles and domain of the present disclosure.

According to one embodiment of the present disclosure, in a method for classifying data points performed by an apparatus for classifying data points, provided may be a method for classifying data points using convex hulls based on centroids of clusters, the method comprising clustering data points into a plurality of clusters; constructing a hyperplane by using a set of centroids of singular clusters having a single class label from the plurality of clusters and removing singular clusters whose centroids are not used to construct the hyperplane; generating a convex hull for a singular cluster used to construct the hyperplane; removing internal data points except for the vertices of the generated convex hull from the singular cluster whose centroid is used to construct the hyperplane; and classifying a set of remaining data points except for the removed internal data points among the plurality of clusters.

The clustering may divide the data points into a plurality of clusters by using the K-means clustering algorithm.

The number of the plurality of clusters may be chosen based on the number of data points and a structure of a data set composed of the data points.

The plurality of clusters may include at least one singular cluster having a single class label and at least one mix cluster having multiple class labels.

The removing singular clusters may construct a hyperplane by applying Support Vector Machine to a set of centroids of the singular clusters and set the centroids used to construct the hyperplane as support vectors.

The generating a convex hull may generate a convex hull for the singular cluster by using the Quickhull algorithm.

The removing internal data points may include selecting vertices of the generated convex hull from the data points of the singular cluster whose centroid is used to construct the hyperplane and remove internal data points located inside the selected convex hull except for the vertices of the selected convex hull.

The removing internal data points may include selecting the respective vertices of the generated convex hull for each singular cluster whose centroid is used to construct the hyperplane.

The set of remaining data points may be constructed by combining vertices of the generated convex hull from the data points of the singular cluster and data points of a mix cluster having multiple class labels from the plurality of clusters.

The classifying a set of remaining data points may include classifying the remaining data points by applying the SVM to the set of remaining data points.

Meanwhile, according to another embodiment of the present disclosure, provided may be an apparatus for classifying data points using convex hulls based on centroids of clusters, the apparatus comprising a memory storing one or more programs; and a processor executing the one or more stored programs, wherein the processor is configured to cluster data points into a plurality of clusters; construct a hyperplane by using a set of centroids of singular clusters having a single class label from the plurality of clusters and remove singular clusters whose centroids are not used to construct the hyperplane; generate a convex hull for a singular cluster used to construct the hyperplane; remove internal data points except for the vertices of the generated convex hull from the singular cluster whose centroid is used to construct the hyperplane; and classify a set of remaining data points except for the removed internal data points among the plurality of clusters.

The processor may be configured to classify the data points into a plurality of clusters by using the K-means clustering algorithm.

The number of the plurality of clusters may be chosen based on the number of data points and a structure of a data set composed of the data points.

The plurality of clusters may include at least one singular cluster having a single class label and at least one mix cluster having multiple class labels.

The processor may be configured to construct a hyperplane by applying Support Vector Machine to a set of centroids of the singular clusters and set the centroids used to construct the hyperplane as support vectors.

The processor may be configured to generate a convex hull for the singular cluster by using the Quickhull algorithm.

The processor may be configured to select vertices of the generated convex hull from the data points of the singular cluster whose centroid is used to construct the hyperplane and remove internal data points located inside the selected convex hull except for the vertices of the selected convex hull.

The processor may be configured to select the respective vertices of the generated convex hull for each singular cluster whose centroid is used to construct the hyperplane.

The set of remaining data points may be constructed by combining vertices of the generated convex hull from the data points of the singular cluster and data points of a mix cluster having multiple class labels from the plurality of clusters.

The processor may be configured to classify the remaining data points by applying the SVM to the set of remaining data points.

Meanwhile, according to yet another embodiment of the present disclosure, in a non-volatile computer-readable storage medium storing one or more programs that may be executed by a processor, provided may be a non-volatile computer-readable storage medium, the medium comprising commands that instruct the processor: to cluster data points into a plurality of clusters; construct a hyperplane by using a set of centroids of singular clusters having a single class label from the plurality of clusters and remove singular clusters whose centroids are not used to construct the hyperplane; generate a convex hull for a singular cluster used to construct the hyperplane; remove internal data points except for the vertices of the generated convex hull from the singular cluster whose centroid is used to construct the hyperplane; and classify a set of remaining data points except for the removed internal data points among the plurality of clusters when the one or more programs are executed by the processor.

BRIEF DESCRIPTION OF THE DRAWINGS

FIG. 14 illustrates the influence of the number of clusters on the number of remaining data points after one embodiment of the present disclosure is applied.

DESCRIPTION OF EXEMPLARY EMBODIMENTS

Since the present disclosure may be modified in various ways and may provide various embodiments, specific embodiments will be depicted in the appended drawings and described in detail with reference to the drawings. However, it should be understood that the specific embodiments are not intended to limit the gist of the present disclosure to the specific embodiments; rather, it should be understood that the specific embodiments include all of the modifications, equivalents, or substitutes belonging to the technical principles and scope of the present disclosure. Also, in describing the present disclosure, if it is determined that a detailed description of a related art included herein unnecessarily obscure the gist of the present disclosure, the detailed description thereof will be omitted.

Terms such as first or second may be used to describe various constituting elements of the present disclosure, but the constituting elements should not be limited by these terms. Those terms are used only for the purpose of distinguishing one constituting element from the others.

Terms used in the present disclosure are intended only for describing a specific embodiment and are not intended to limit the technical scope of the present disclosure. Terms used in the present disclosure have been selected as much as possible from general terms that are relevant to the functions of the present disclosure and currently in wide use; however, selection of the terms may be varied depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

A singular expression should be understood to indicate a plural expression unless otherwise explicitly stated. In the present disclosure, the term "include" or "have" is used to indicate existence of an embodied feature, number, step, operation, constituting element, component, or a combination thereof; and should not be understood to preclude the existence or possibility of adding one or more other features, numbers, steps, operations, constituting elements, components, or a combination thereof.

In what follows, embodiments of the present disclosure will be described in detail with reference to appended drawings; in describing the present disclosure with reference to the appended drawings, the same or corresponding constituting element is assigned the same reference number, and repeated descriptions thereof will be omitted.

Figure 1:
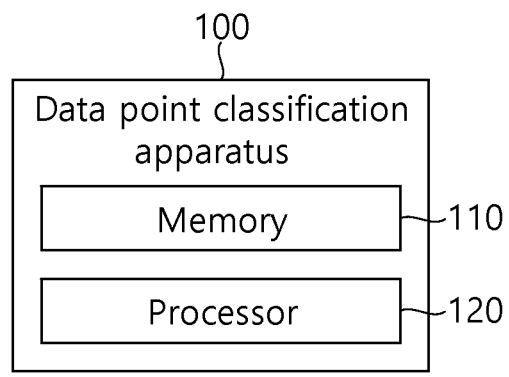
FIG. 1 illustrates a structure of an apparatus for classifying data points using convex hulls based on centroids of clusters according to one embodiment of the present disclosure.

FIG. 1 illustrates a structure of an apparatus for classifying data points using convex hulls based on centroids of clusters according to one embodiment of the present disclosure.

As shown in FIG. 1, a data point classification apparatus 100 using convex hulls based on centroids of clusters according to one embodiment of the present disclosure includes a memory 110 and a processor 120. However, not all of the illustrated constituting elements are essential constituting elements. The data point classification apparatus 100 may be implemented with more or a fewer number of constituting elements than the constituting elements illustrated.

The data point classification apparatus 100 using convex hulls based on centroids of clusters according to one embodiment of the present disclosure clusters all of the training data points using the K-means clustering algorithm, applies SVM to the centroids of the resultant clusters, and removes redundant singular clusters of a single class label, which are unrelated to support vectors.

A Support Vector Machine (SVM) separates data points by constructing a hyperplane that has the largest distance to two classes. The hyperplane is determined by Support Vectors (SVs). Therefore, support vectors are the unique training data points required for the SVM algorithm. The data point classification apparatus 100 may remove other data points by using SVs without affecting classification accuracy based on the SVM. Therefore, the data point classification apparatus 100 may reduce data training time and complexity of classification substantially. In particular, in the case of a large-scale data set, the data point classification apparatus 100 according to one embodiment of the present disclosure may efficiently recognize the SVs required for training of an SVM while removing data points of singular clusters including the remaining centroids.

After redundant singular clusters are removed, the data point classification apparatus 100 applies a convex hull algorithm to the remaining singular clusters and selects only the vertices of convex hulls as training data points. The data point classification apparatus 100 removes all of the internal data points constituting the remaining singular clusters except for the vertices of the convex hulls. As described above, one embodiment of the present disclosure may classify a large-scale data set in an efficient manner and, thus, reduce training time significantly by performing operations for removing redundant singular clusters and internal data points.

In what follows, a specific structure and operation of each constituting element of the data point classification apparatus 100 using convex hulls based on centroids of clusters according to one embodiment of the present disclosure of FIG. 1 will be described.

The memory 110 stores one or more programs. Also, the memory 110 stores training data points for training of an SVM.

The processor 120 executes one or more programs stored in the memory 110.

The processor 120 clusters data points into a plurality of clusters; constructs a hyperplane by using a set of centroids of singular clusters having a single class label from the plurality of clusters and removes singular clusters whose centroids are not used to construct the hyperplane; generates a convex hull for a singular cluster used to construct the hyperplane; removes internal data points except for the vertices of the generated convex hull from the singular cluster whose centroid is used to construct the hyperplane; and classifies a set of remaining data points except for the removed internal data points among the plurality of clusters.

According to the embodiments, the processor 120 may divide the data points into a plurality of clusters by using the K-mean clustering algorithm.

According to the embodiments, the number of a plurality of clusters may be chosen based on the number of data points and a structure of a data set composed of the data points.

According to the embodiments, a plurality of clusters may include at least one singular cluster having a single class label and at least one mix cluster having multiple class labels.

According to the embodiments, the processor 120 may construct a hyperplane by applying an SVM to a set of centroids of singular clusters and set the centroids used to construct the hyperplane as support vectors.

According to the embodiments, the processor 120 may generate a convex hull for the singular cluster by using the Quickhull algorithm.

According to the embodiments, the processor 120 may select vertices of the generated convex hull from the data points of a singular cluster whose centroid is used to construct the hyperplane and remove internal data points located inside the selected convex hull except for the vertices of the selected convex hull.

According to the embodiments, the processor 120 may select the respective vertices of the generated convex hull for each singular cluster whose centroid is used to construct the hyperplane.

According to the embodiments, a set of remaining data points may be constructed by combining vertices of the generated convex hull from the data points of the singular cluster and data points of a mix cluster having multiple class labels from the plurality of clusters.

According to the embodiments, the processor 120 may classify the remaining data points by applying the SVM to the set of remaining data points.

Figure 2:
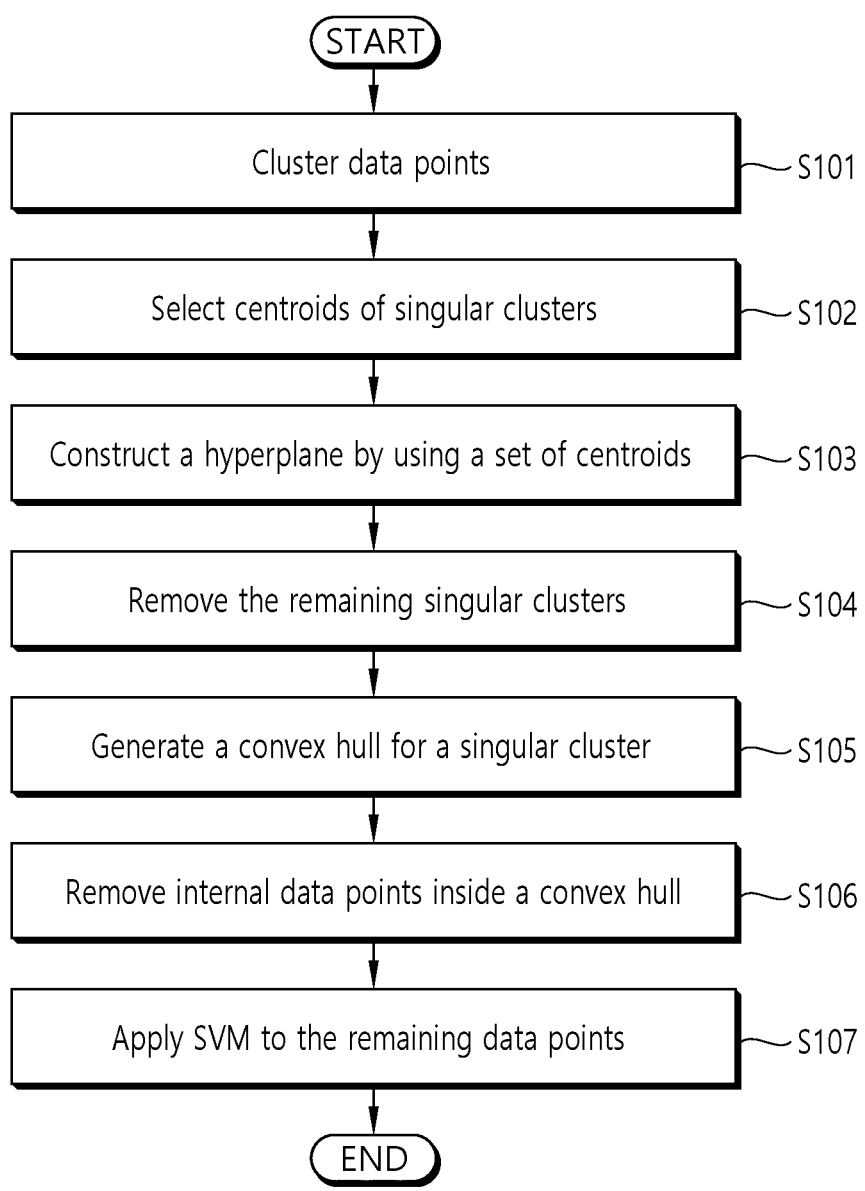
FIG. 2 is a flow diagram illustrating a method for classifying data points using convex hulls based on centroids of clusters according to one embodiment of the present disclosure.

FIG. 2 is a flow diagram illustrating a method for classifying data points using convex hulls based on centroids of clusters according to one embodiment of the present disclosure.

In the S101 step, the data point classification apparatus 100 generates clusters from data points.

In the S102 step, the data point classification apparatus 100 selects centroids of singular clusters from a plurality of clusters generated.

In the S103 step, the data point classification apparatus 100 constructs a hyperplane by using a set of centroids of selected singular clusters.

In the S104 step, the data point classification apparatus 100 removes the remaining singular clusters whose centroids are not used to construct the hyperplane.

In the S105 step, the data point classification apparatus 100 generates a convex hull for a singular cluster whose centroid is used to construct the hyperplane.

In the S106 step, the data point classification apparatus 100 removes internal data points located inside the generated convex hull.

In the S107 step, the data point classification apparatus 100 classifies the remaining data points except for the removed internal data points by applying an SVM to the data points.

In what follows, a method for classifying data points will be described in more detail with reference to FIGS. 3 to 6.

Figure 3:
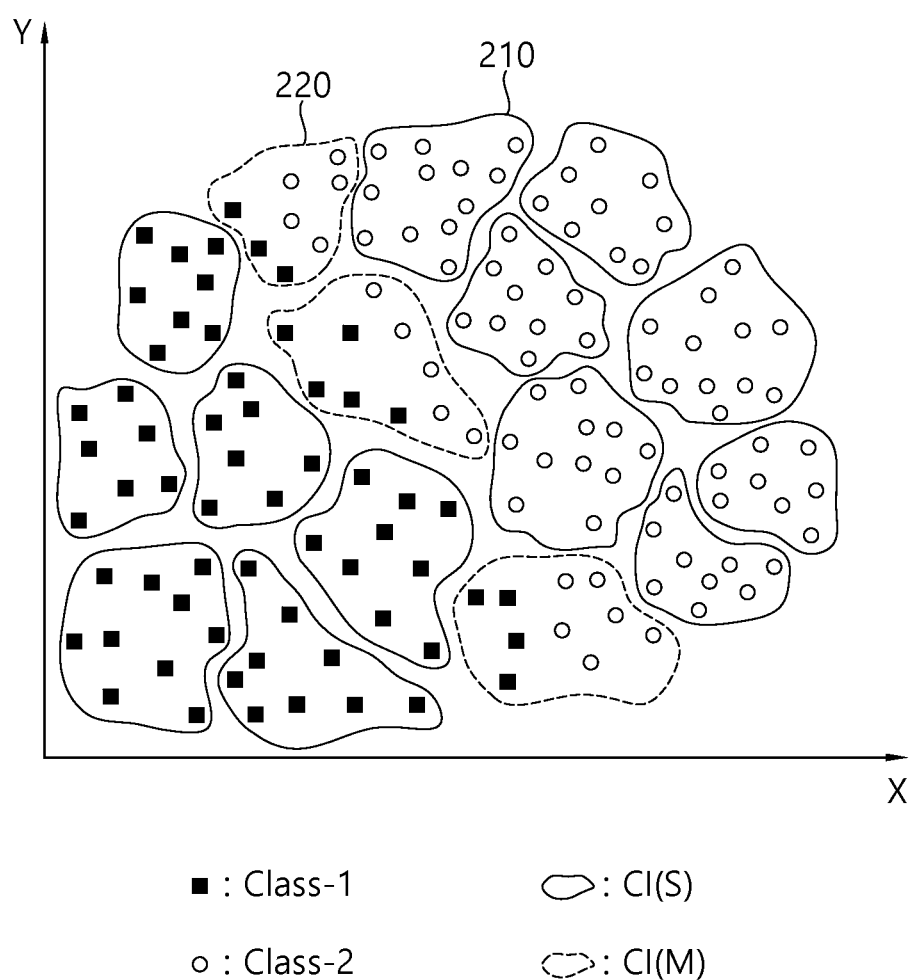
FIG. 3 illustrates an example of clustering of training data points used in one embodiment of the present disclosure.

FIG. 3 illustrates an example of clustering of training data points used in one embodiment of the present disclosure.

The data point classification apparatus 100 divides training data into k clusters by applying K-means clustering. At this time, the k clusters are classified into two types: Singular (S) and Mix (M) clusters. Here, the singular cluster Cl(S) 210 represents a cluster of only one single class label for all the data points therein. On the other hand, the mix cluster Cl(M) 220 contains more than one class label. $n_s$ and $n_m$ denote the number of clusters Cl(S) and Cl(M), respectively, where $k=n_s \cup n_m$. FIG. 3 shows clustering of a sample data set containing both types of clusters. At this time, since Cl(M) 220 contains more than one class label, data points of two class labels close to the hyperplane may be included.

Figure 4:
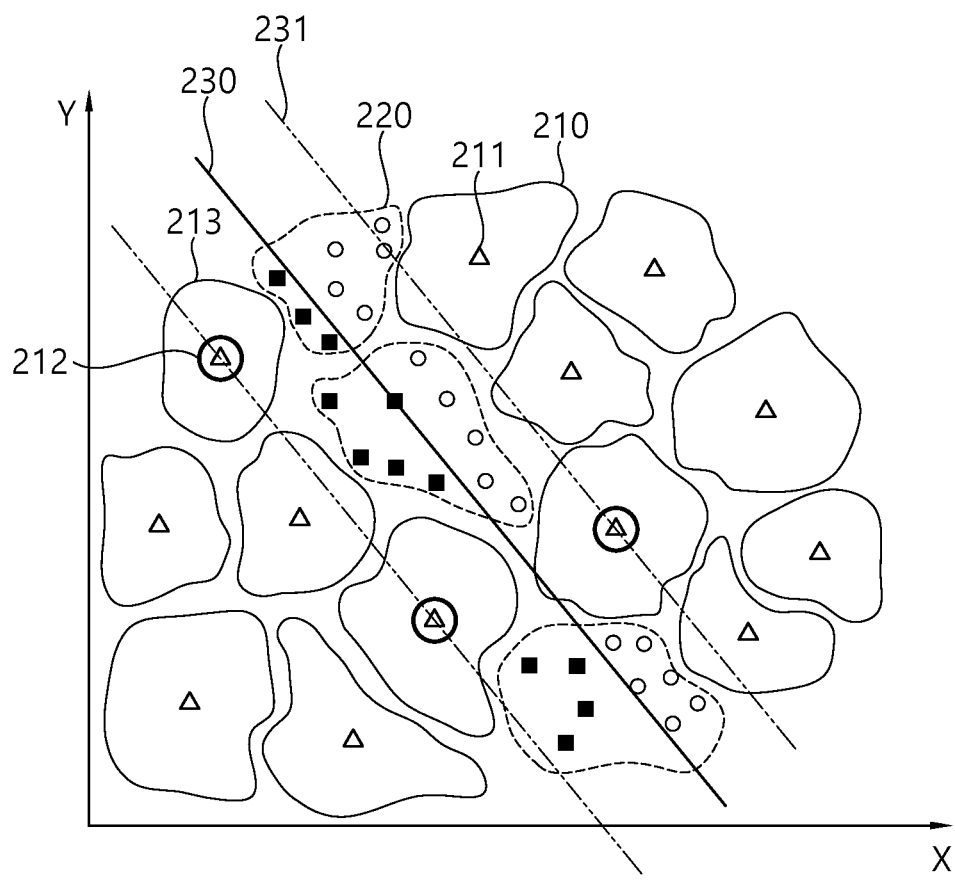
FIG. 4 illustrates an example in which initial SVM selects centroids of clusters according to one embodiment of the present disclosure.

FIG. 4 illustrates an example in which initial SVM selects centroids of clusters according to one embodiment of the present disclosure.

Since Support Vectors (SVs) lie in the vicinity of the hyperplane, the mix cluster Cl(M) 220 is more likely to have SVs. Therefore, when an SVM classifies data points based on the SVs, the data point classification apparatus 100 according to one embodiment of the present disclosure may reduce data points of the singular cluster Cl(S) 210 by using a convex hull while retaining the original data points belonging to the mix cluster Cl(M) 220.

When the K-mean clustering is applied, the centroid 211 of an S-type cluster is calculated by Eq. 1 below.

$$c_i = (1/n_i)\sum_{j=1}^{n_i} x_j \quad [\text{Eq. 1}]$$

In Eq. 1, $n_i$ represents the number of data points of cluster i. $C_{tr} = \{(c_i, l_i) | l_i \in 1, -1, i=1, 2, \ldots, n_s\}$ represents a set of centroids of S-type clusters, and $l_i$ represents the label of the samples of cluster i.

The data point classification apparatus 100 applies an SVM to the set of centroids of training data points $C_{tr}$ to construct a hyperplane by using the centroids 211 of the clusters. In other words, the set of centroids of training data points $C_{tr}$ is used to construct a hyperplane 230 from the centroids 211 of the clusters. The centroids 212 of the clusters deemed to be support vectors are defined as Cent (SV). FIG. 4 shows a result of applying an SVM to a sample data set. Here, the hyperplane 230 is a hyperplane constructed temporarily, showing a safety margin 231 for the SVM.

Figure 5:
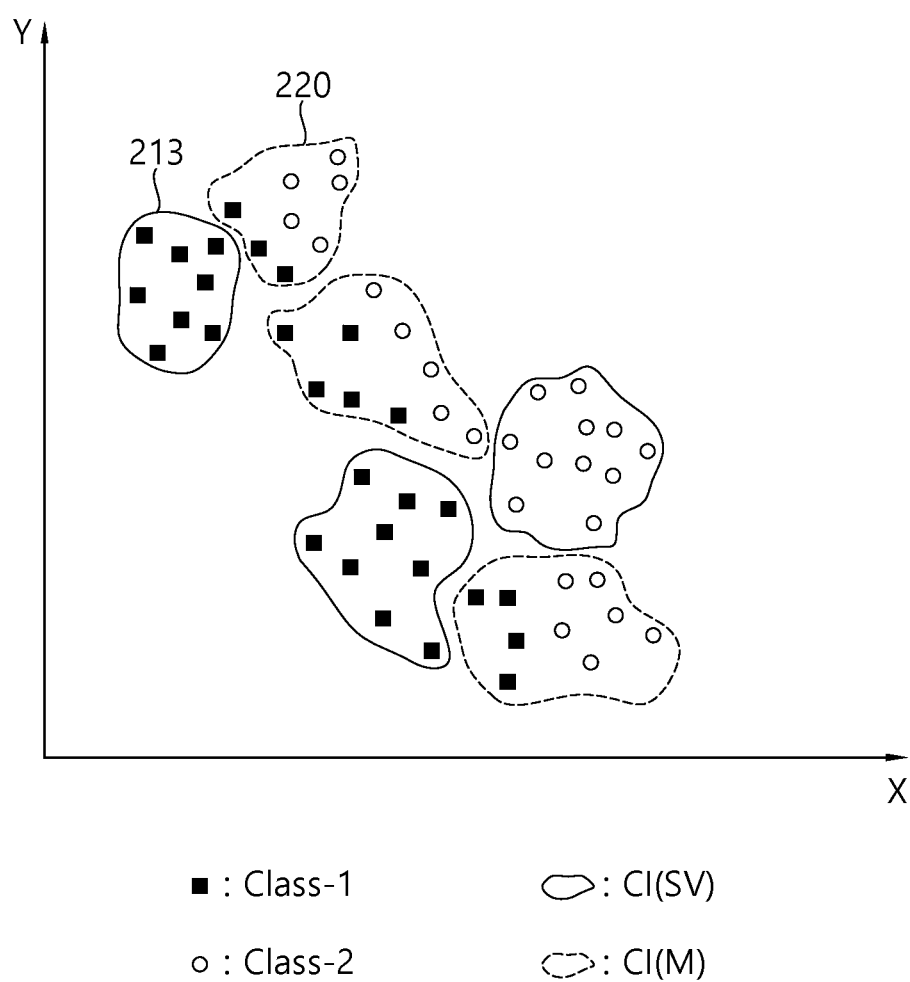
FIG. 5 illustrates input data points after the remaining singular clusters are removed according to one embodiment of the present disclosure.

FIG. 5 illustrates input data points after the remaining singular clusters are removed according to one embodiment of the present disclosure.

The centroids deemed to be support vectors Cent(SV) 212 to construct the hyperplane 230 affect the SVM and construction of the hyperplane. The data point classification apparatus 100 determines a singular cluster containing the centroid deemed to be the support vector Cent(SV) 212 as a support vector cluster Cl(SV) 213 and selects the determined singular cluster as an input to the next operation for classifying data points. Then, the data point classification apparatus 100 removes all of the remaining singular clusters.

The data point classification apparatus 100 may reduce the number of training data points significantly by removing the remaining singular clusters non-Cl(SV). FIG. 5 shows support vector clusters Cl(SV) 213 whose centroids are deemed to be support vectors and training data points of mix clusters Cl(M) 220.

Figure 6:
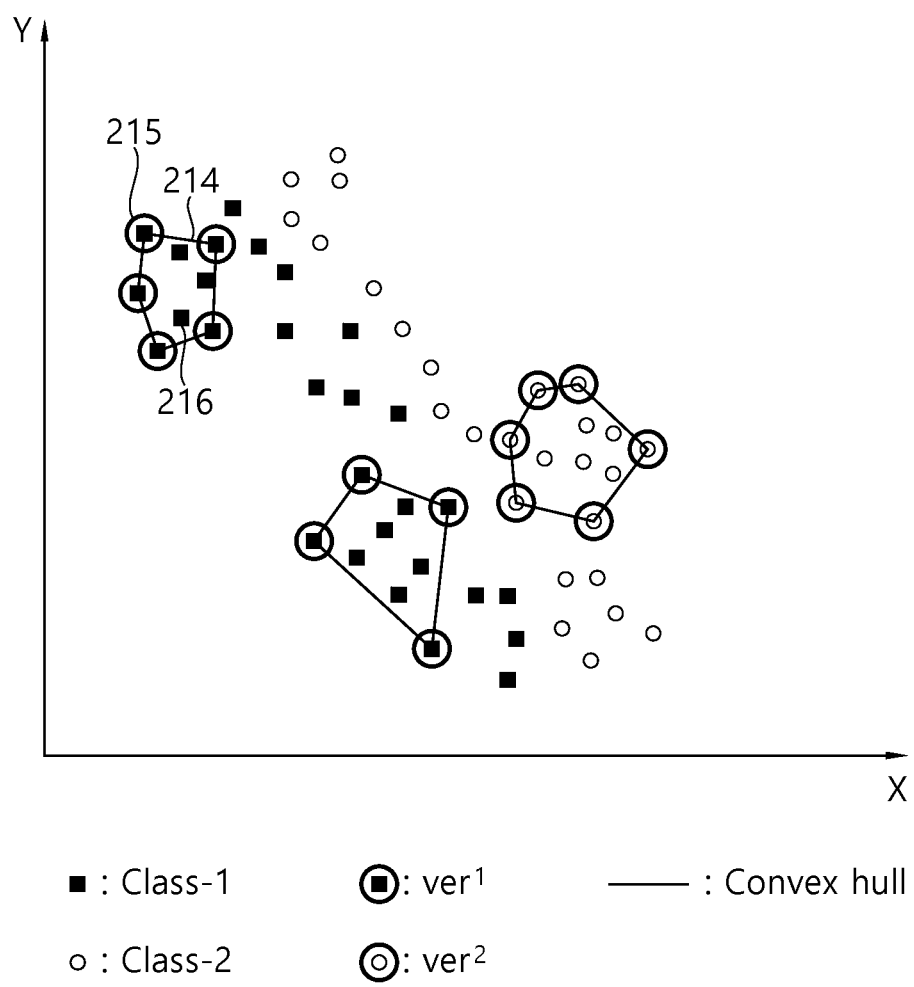
FIG. 6 illustrates recognizing vertices of convex hulls according to one embodiment of the present disclosure.

FIG. 6 illustrates recognizing vertices of convex hulls according to one embodiment of the present disclosure.

Although a large amount of data points are removed through the operations illustrated in FIGS. 3 to 5, support vector clusters Cl(SV) 213 and mix clusters Cl(M) 220 still contain unnecessary data points. The data point classification apparatus 100 removes unnecessary data points located inside the support vector clusters Cl(SV) 213 by constructing and applying a convex hull 214. Since SVs lie close to the hyperplane, training data points at the boundaries of the clusters are highly likely to become support vectors while the internal training data points 216 are less likely to become support vectors. Therefore, the vertices 215 of the convex hull 214 of the support vector cluster Cl(SV) 213 whose centroid is deemed to be a support vector are selected as training data points. Meanwhile, the internal training data points 216 are considered to be unnecessary redundant data points and removed.

The convex hulls of the support vector clusters Cl(SV) the centroids of which are considered to be support vectors may be constructed by applying the Quickhull algorithm. The vertices 215 of the convex hull $V = \text{ver}^1 \cup \text{ver}^2$ are selected as training data points to construct a hyperplane. At this time, $\text{ver}^1$ and $\text{ver}^2$ represent the vertices, namely, extreme points of convex hulls of clusters with class label-1 (Class 1) and class label-2 (Class 2). FIG. 6 shows vertices 215 of support vector clusters Cl(SV), the centroids of which are considered to be support vectors in a training data set.

Figure 7:
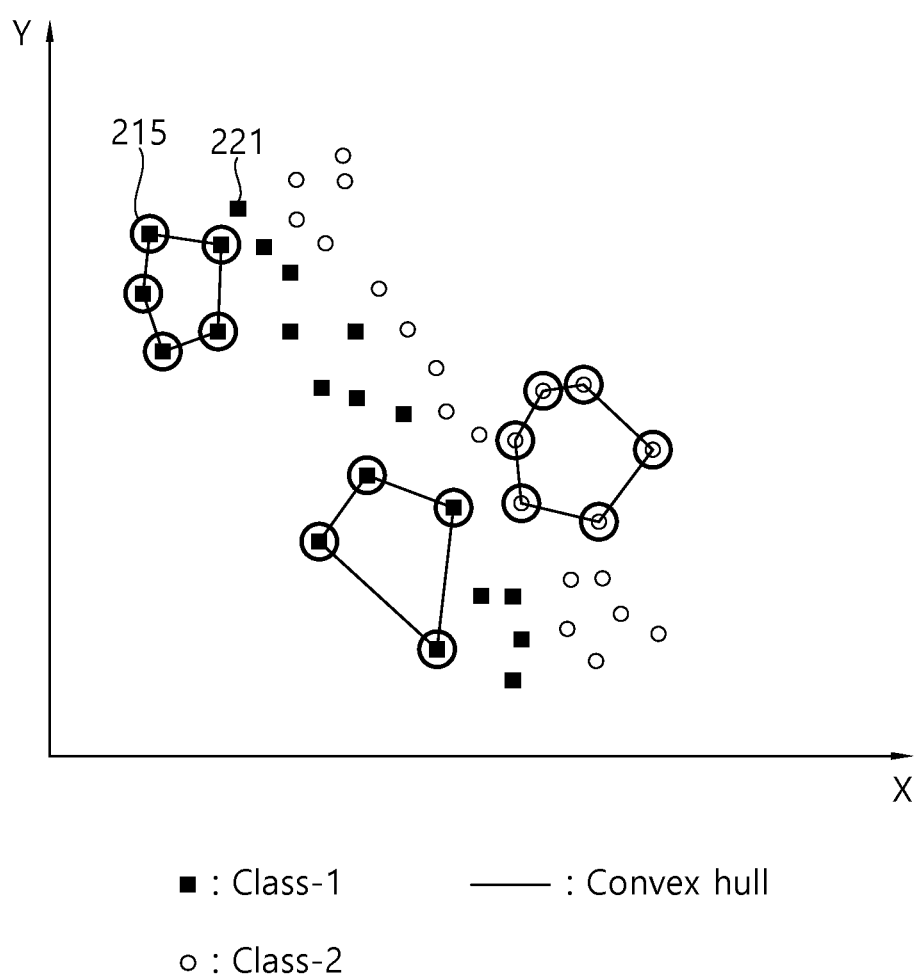
FIG. 7 illustrates a set of remaining data points according to one embodiment of the present disclosure.

FIG. 7 illustrates a set of remaining data points according to one embodiment of the present disclosure.

The data point classification apparatus 100 removes internal training data points 216 other than the vertices 215 of the convex hulls 214 from the support vector clusters Cl(SV) 213 the centroids of which are considered to be support vectors.

Afterwards, the remaining training data points are composed of the vertices 215 of the convex hulls 214 of the support vector clusters Cl(SV) the centroids of which are considered to be support vectors and the data points 221 belonging to the mix clusters Cl(M) 220. FIG. 7 shows remaining training data points.

Next, the data point classification apparatus 100 applies an SVM to the remaining training data points. The data point classification apparatus 100 according to one embodiment of the present disclosure performs data classification on a much smaller number of data points than the original training data set and as a result, a hyperplane may be constructed very fast. While the SVM algorithm is typically powerful to solve only binary classification problems, various real-world classification problems involving actual data sets have to deal with multi-class labels. Therefore, the data point classification apparatus 100 according to one embodiment of the present disclosure may apply the One-Against-All (OAA) technique to solve multi-dimensional classification problems.

Figure 8:
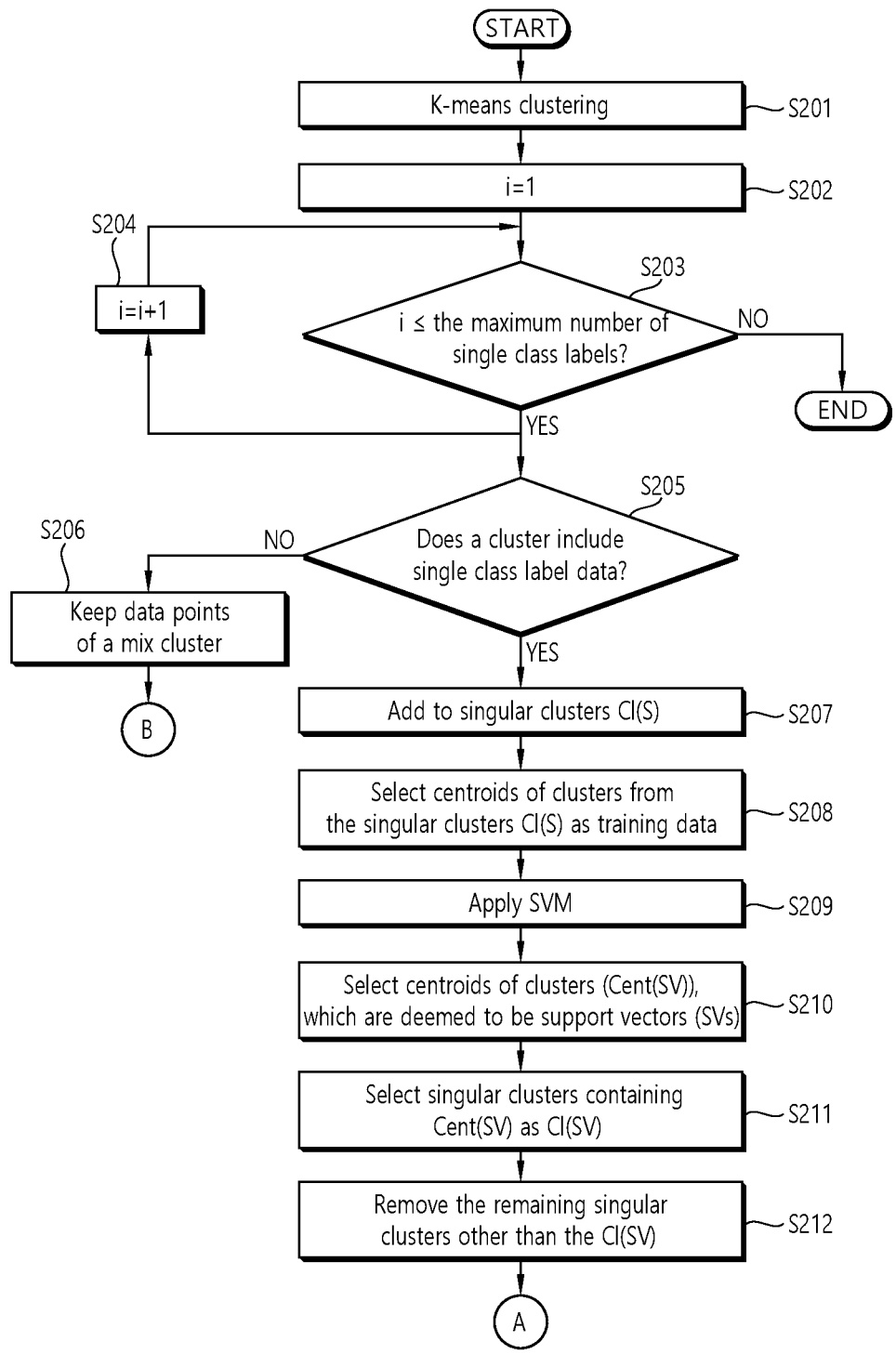
FIGS. 8 and 9 illustrate a detailed flow diagram of a method for classifying data points using convex hulls based on centroids of clusters according to one embodiment of the present disclosure.
Figure 9:
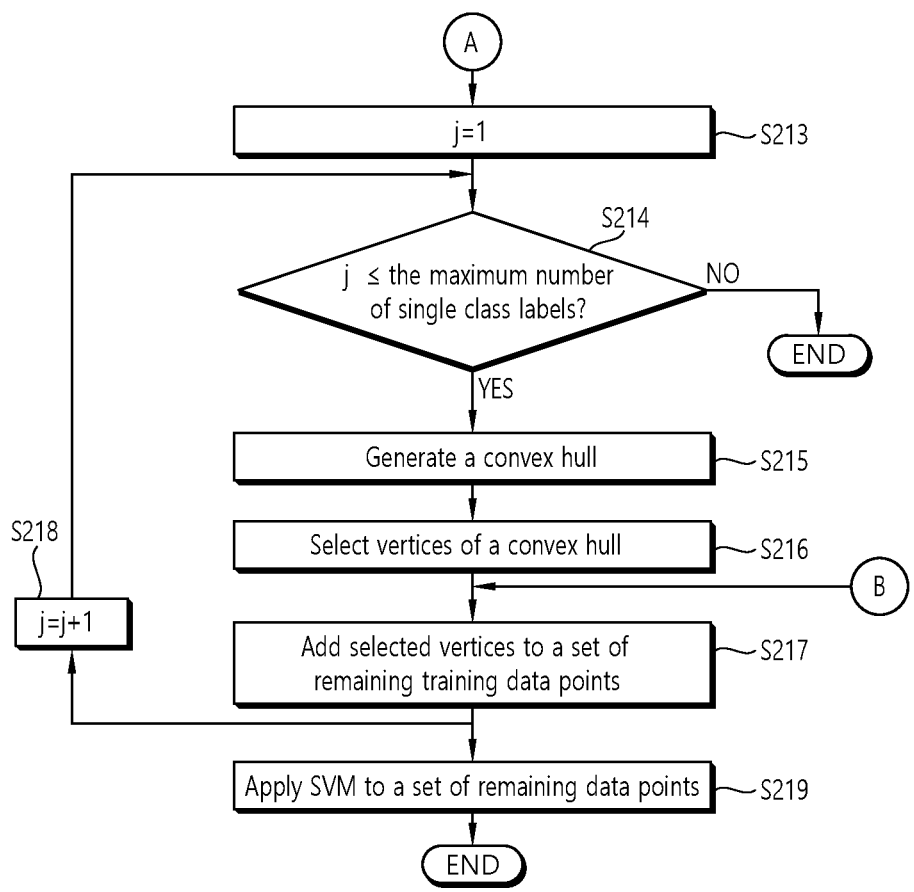

FIGS. 8 and 9 illustrate a detailed flow diagram of a method for classifying data points using convex hulls based on centroids of clusters according to one embodiment of the present disclosure.

In FIGS. 8 and 9, constituting steps are connected via links A-A and B-B.

In the S201 step, the data point classification apparatus 100 performs K-mean clustering on data points.

In the S202 step, the data point classification apparatus 100 performs an operation of i=1. Here, i represents a class label number.

In the S203 step, the data point classification apparatus 100 checks whether i≤the maximum number of single class labels.

In the S204 step, if i≤the maximum number of single class labels, the data point classification apparatus 100 performs an operation of i=i+1.

Also, in the S205 step, if i≤the maximum number of single class labels, the data point classification apparatus 100 checks whether a cluster contains data points of a single class label.

In the S206 step, if a cluster contains data points of more than one single class label, the data point classification apparatus 100 keeps data points of a mix cluster.

On the other hand, in the S207 step, if a cluster contains data points of only the single class label, the data point classification apparatus 100 adds the cluster to singular clusters Cl(S).

In the S208 step, the data point classification apparatus 100 selects the centroids of the singular clusters Cl(S) as training data points.

In the S209 step, the data point classification apparatus 100 applies an SVM to the set of centroids of the singular clusters Cl(S). The SVM is applied to construct a hyperplane. Here, the hyperplane is a hyperplane in the initial phase, which is constructed temporarily to remove the remaining clusters Cl(S).

In the S210 step, after applying the SVM, the data point classification apparatus 100 selects the centroids Cent(SV) of support vector clusters, which are deemed to be support vectors.

In the S211 step, the data point classification apparatus 100 selects singular clusters containing the centroids Cent (SV) of the support vector clusters as support vector clusters Cl(SV).

In the S212 step, the data point classification apparatus 100 removes the remaining singular clusters other than the support vector clusters Cl(SV).

In the S213 step, the data point classification apparatus 100 performs an operation of j=1. Here, j represents a cluster number.

In the S214 step, the data point classification apparatus 100 checks whether j≤the maximum number of single class labels.

In the S215 step, if j≤the maximum number of single class labels, the data point classification apparatus 100 generates a convex hull.

In the S216 step, the data point classification apparatus 100 selects vertices of the convex hull.

In the S217 step, the data point classification apparatus 100 adds the selected vertices of the convex hull to a set of remaining training data points. Also, the data point classification apparatus 100 adds the data points of the mix clusters keeped in the S206 step to the set of remaining training data points.

Also, in the S218 step, the data point classification apparatus 100 performs an operation of j=j+1.

In the S219 step, the data point classification apparatus 100 applies the SVM to the set of remaining data points.

Meanwhile, computer simulations are conducted to validate the result according to one embodiment of the present disclosure. In particular, performance of the Clustering-Based Convex Hull (CBCH) method according to one embodiment of the present disclosure is evaluated using MATLAB toolbox based on various artificial data sets and two different real-world data sets.

Meanwhile, computer simulations are conducted to validate the result according to one embodiment of the present disclosure. In particular, performance of the Support Vector Clusters-Convex Hull (SVC-CH) method according to one embodiment of the present disclosure is evaluated using MATLAB toolbox based on various artificial data sets and two different real-world data sets.

Figure 10:
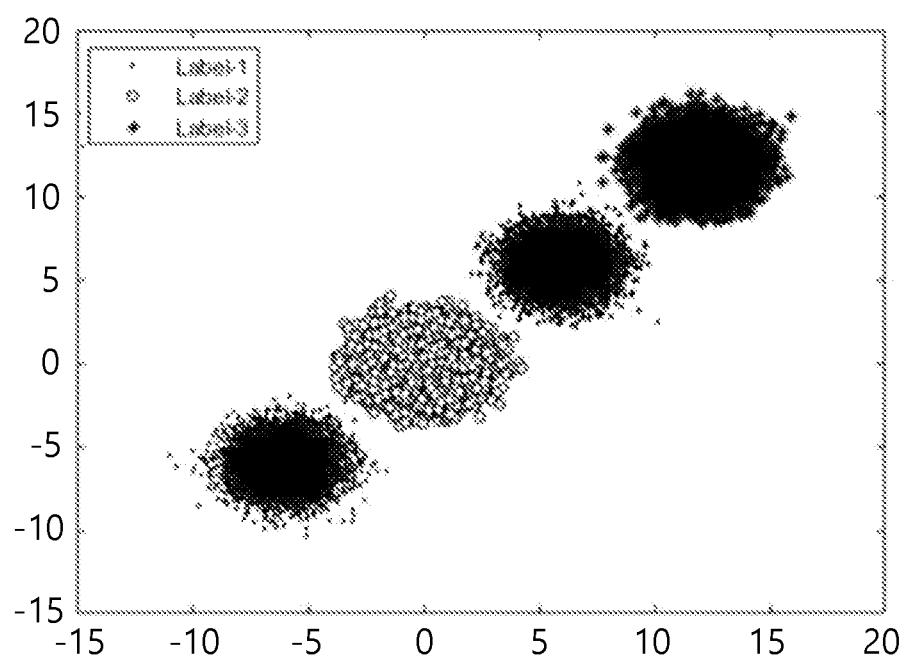
FIG. 10 illustrates data point sets according to Gaussian distributions.
Figure 11:
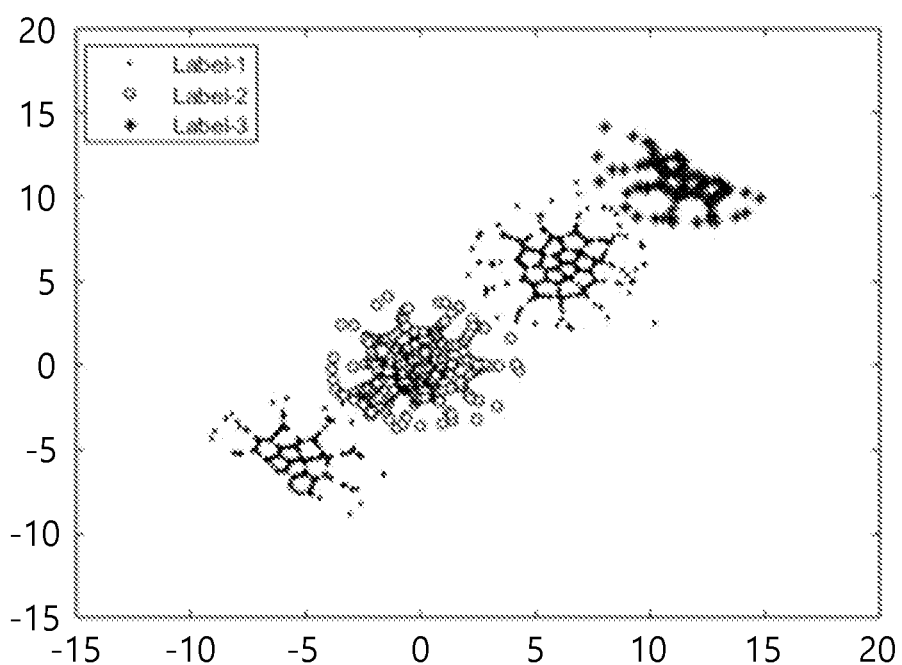
FIG. 11 illustrates remaining data points after one embodiment of the present disclosure is applied to FIG. 10.

FIG. 10 illustrates data point sets according to Gaussian distributions, and FIG. 11 illustrates remaining data points after one embodiment of the present disclosure is applied to FIG. 10.

FIG. 10 shows data points having Label-1, Label-2, and Label-3 according to Gaussian distributions. FIG. 11 shows the remaining data points after the SVC-CH method according to one embodiment of the present disclosure is applied to the data point sets shown in FIG. 10.

Figure 12:
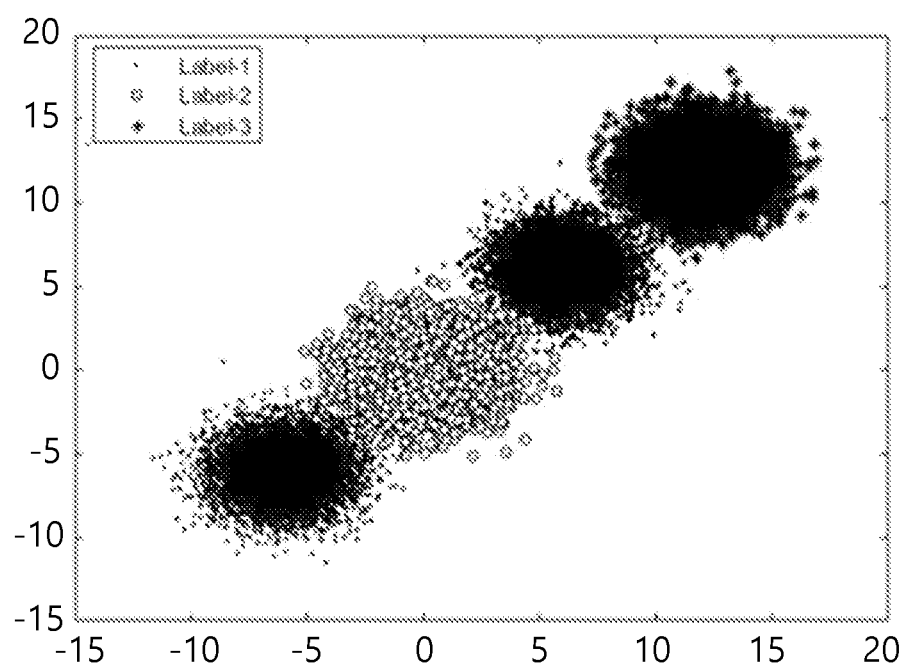
FIG. 12 illustrates data point sets obtained when the variance of the Gaussian distribution is increased to 1.96.
Figure 13:
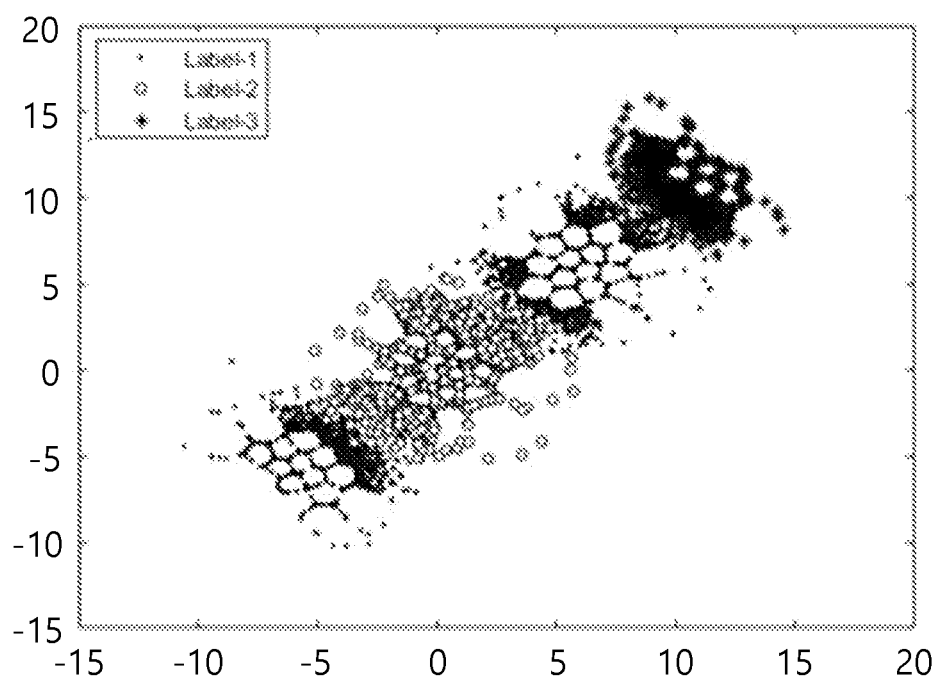
FIG. 13 illustrates remaining data points after one embodiment of the present disclosure is applied to FIG. 12.

FIG. 12 shows data point sets when the variance of the Gaussian distribution is increased to 1.96, and FIG. 13 shows the remaining data points after one embodiment of the present disclosure is applied to FIG. 12.

FIG. 12 shows data points having Label-1, Label-2, and Label-3 after the variance of the Gaussian distribution is increased to 1.96. FIG. 13 shows the remaining data points after the SVC-CH method according to one embodiment of the present disclosure is applied to the data point sets shown in FIG. 12.

FIG. 14 illustrates the influence of the number of clusters on the number of remaining data points after one embodiment of the present disclosure is applied.

FIG. 14 shows the number of clusters with respect to the number of remaining data points after one embodiment of the present disclosure is applied to the data set-1 and the data set-2. The figure shows the number of remaining data points when the number of clusters is increased from 50 to 100, 150, and 200, respectively.

Meanwhile, the banana data set and the skin segmentation data set are chosen from the KEEL data set repository and the UCI machine learning database repository, respectively, as the real-world data set. Also, various artificial data sets are generated to assess the performance of the SVC-CH method according to one embodiment of the present disclosure for a very large-scale data set.

To demonstrate the efficiency of the SVC-CH method according to one embodiment of the present disclosure, performance of the SVC-CH method is compared with those of the conventional Sequential Minimal Optimization (SMO) algorithm, clustering-based algorithm, and Fisher's Discriminant Ratio (FDR)-based algorithm. Since the SMO algorithm uses all of data points without any reduction thereof, a very high accuracy may be achieved after a long training time.

Figure 15:
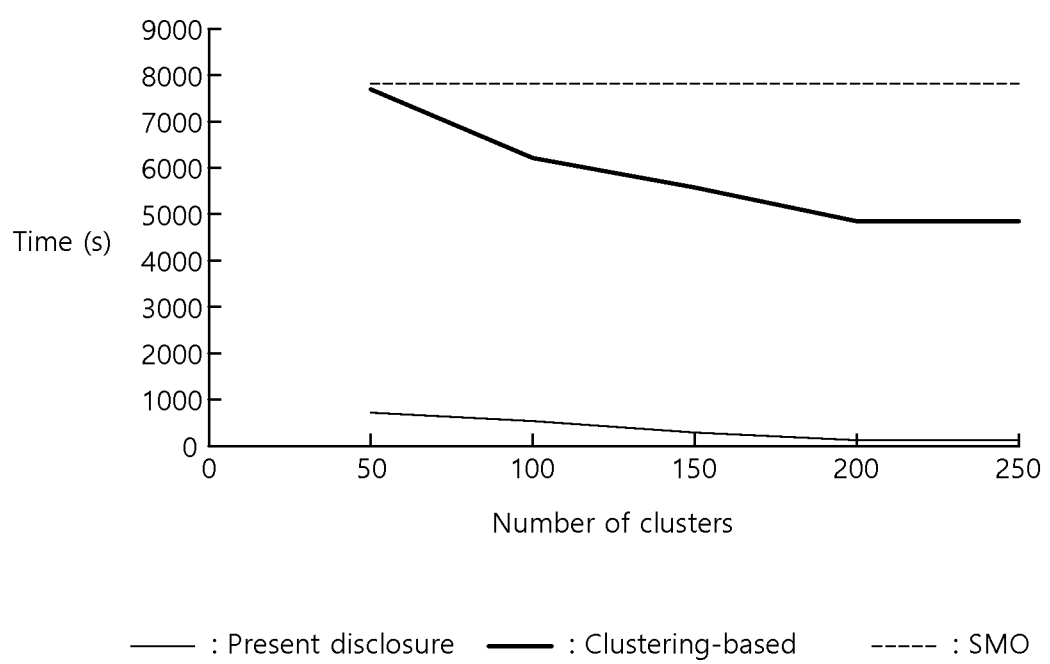
FIGS. 15 and 16 illustrate comparison of training times and classification accuracies for a skin segmentation data set according to one embodiment of the present disclosure and conventional classification algorithms.
Figure 16:
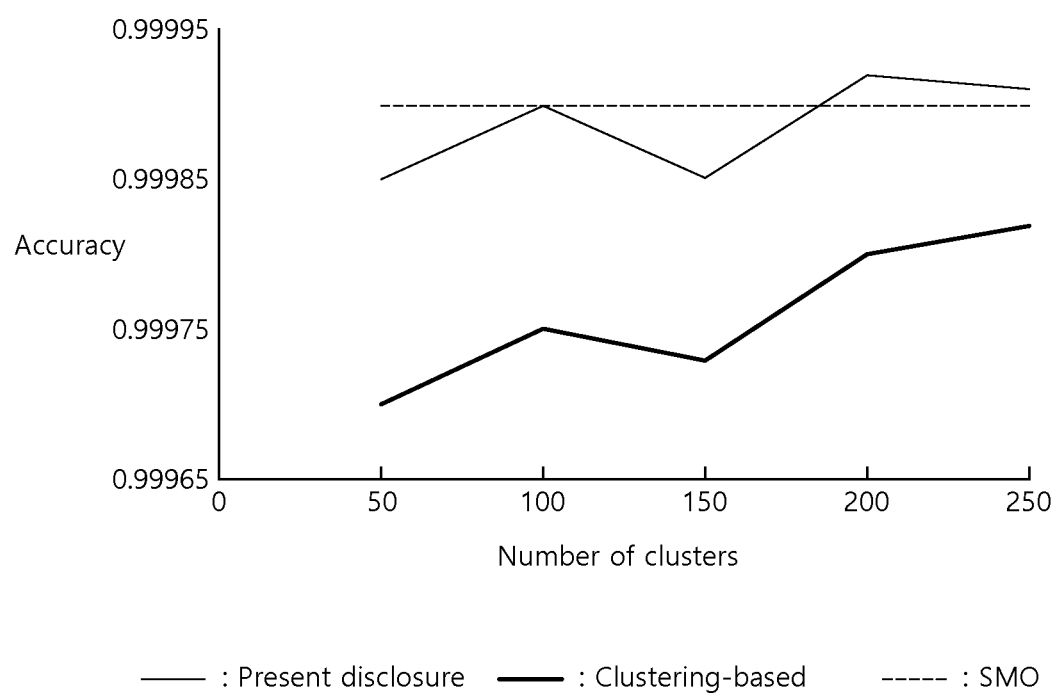

FIGS. 15 and 16 illustrate comparison of training times and classification accuracies for a skin segmentation data set according to one embodiment of the present disclosure and conventional classification algorithms.

The skin segmentation data set is a real-world data set containing 245057 samples in 4D space. The training time and accuracy of the SVC-CH method according to one embodiment of the present disclosure for the skin segmentation data set are compared with those of three other conventional methods when the number of clusters increases from 50 to 200. The simulation results demonstrate that the SVC-CH method according to one embodiment of the present disclosure achieves high accuracy comparable to that of the SMO algorithm while exhibiting a much faster computational speed than the other methods.

Figure 17:
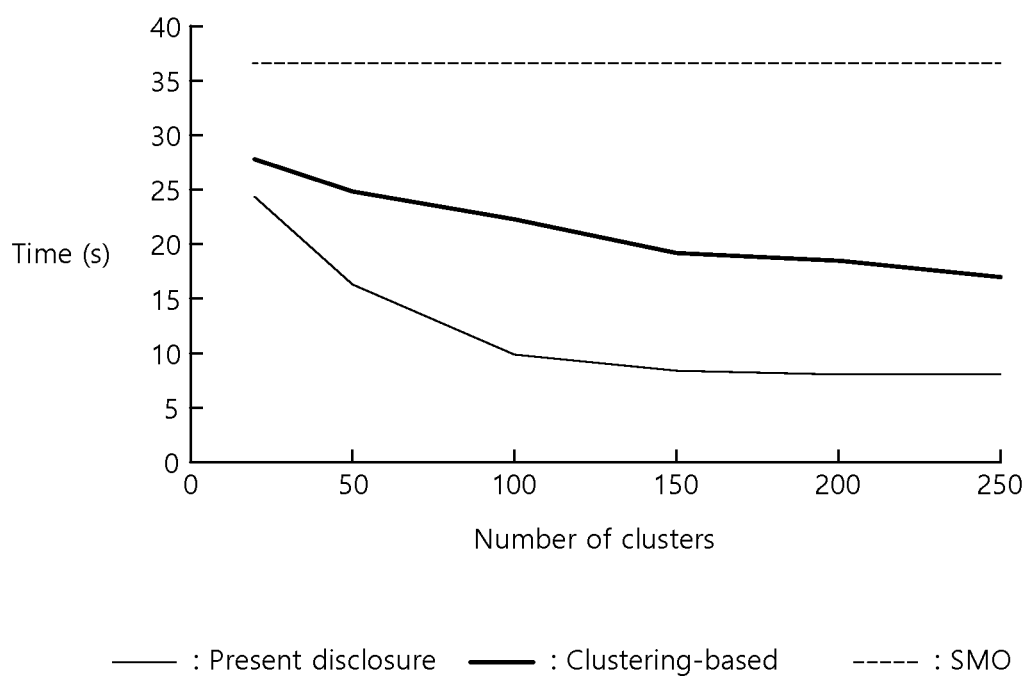
FIGS. 17 and 18 illustrate comparison of training times and classification accuracies for a banana data set according to one embodiment of the present disclosure and conventional classification algorithms.
Figure 18:
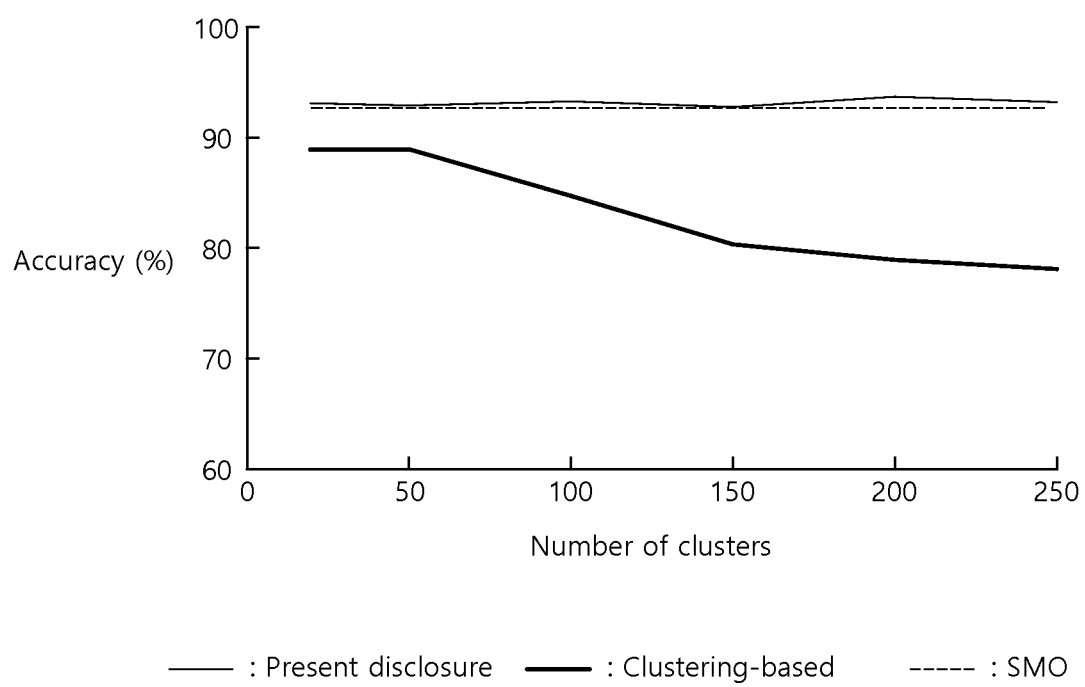
Figure 19:
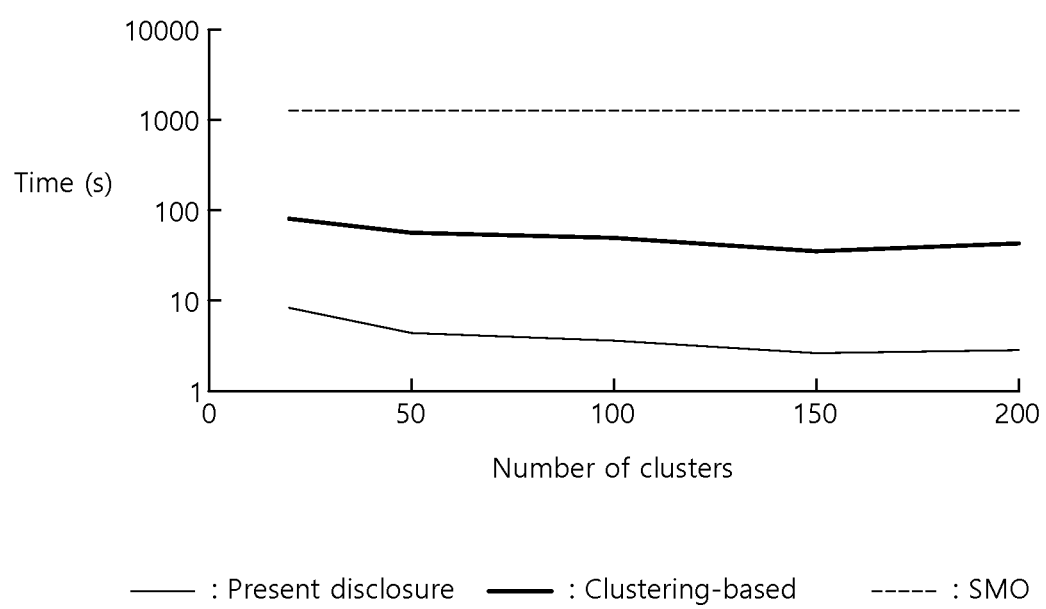
FIGS. 19 to 22 illustrate comparison of training times for artificial data sets according to one embodiment of the present disclosure and conventional classification algorithms.
Figure 20:
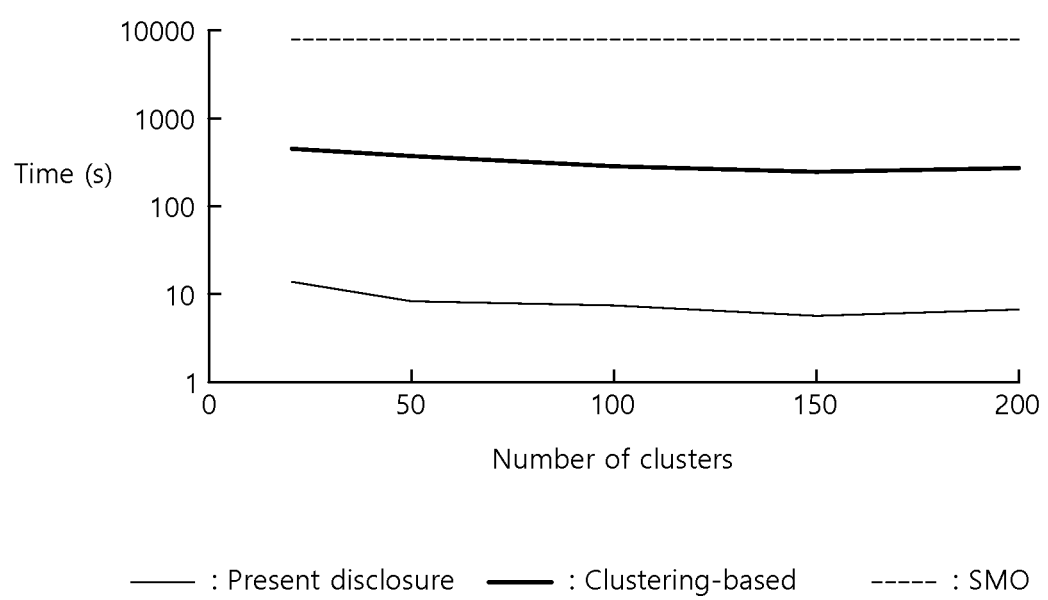
Figure 21:
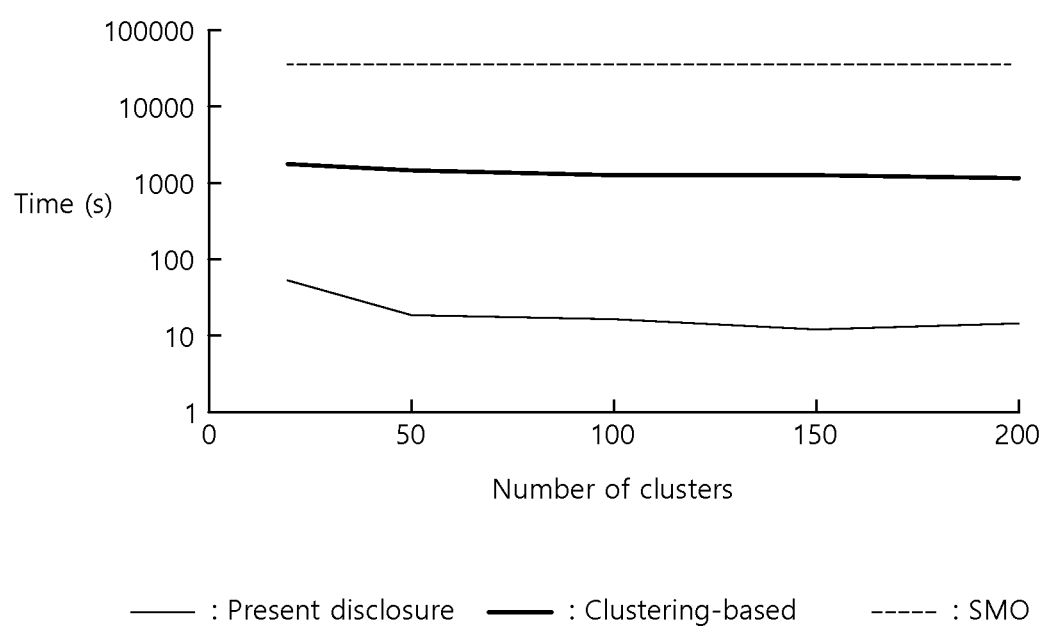
Figure 22:
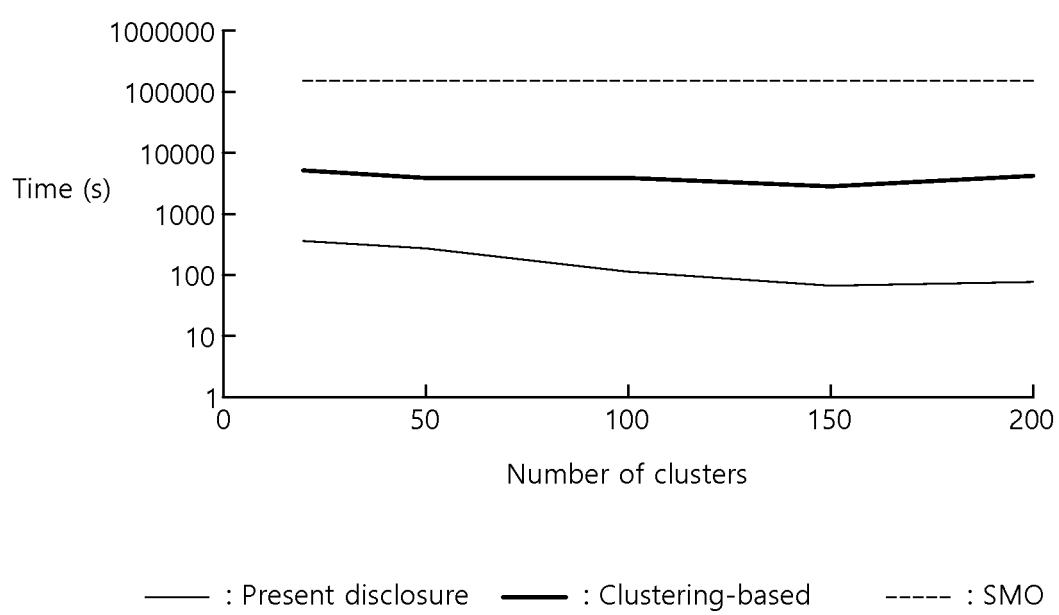
Figure 23:
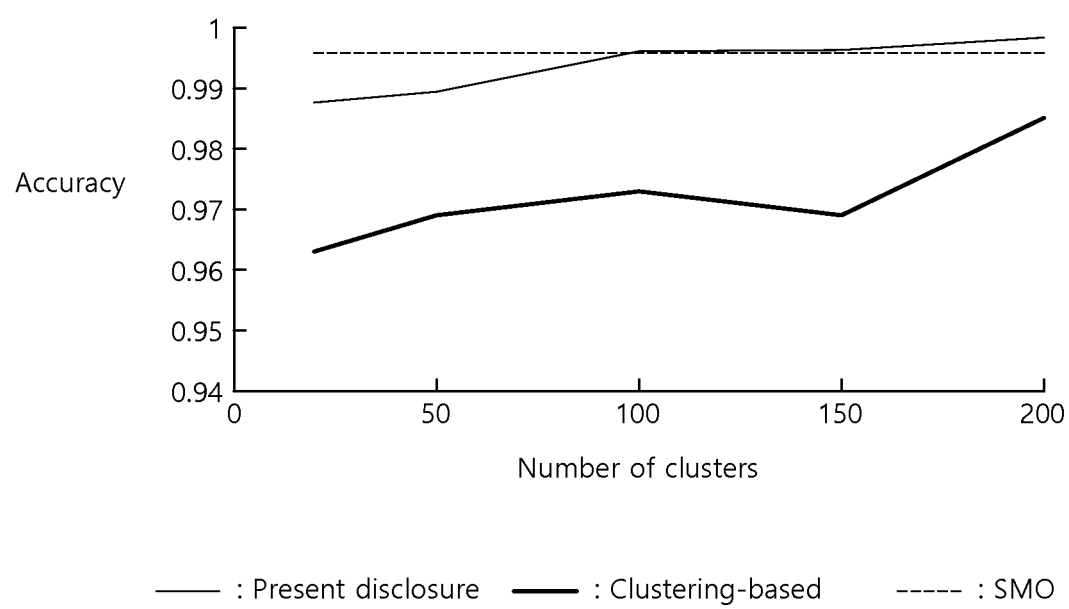
FIGS. 23 to 26 illustrate comparison of classification accuracies for artificial data sets according to one embodiment of the present disclosure and conventional classification algorithms.
Figure 24:
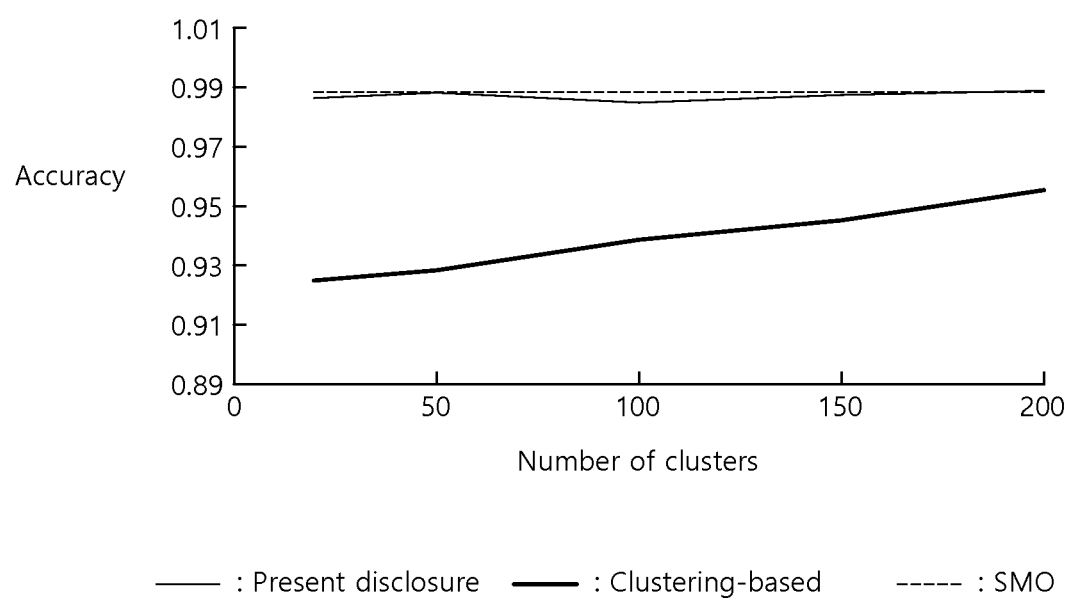
Figure 25:
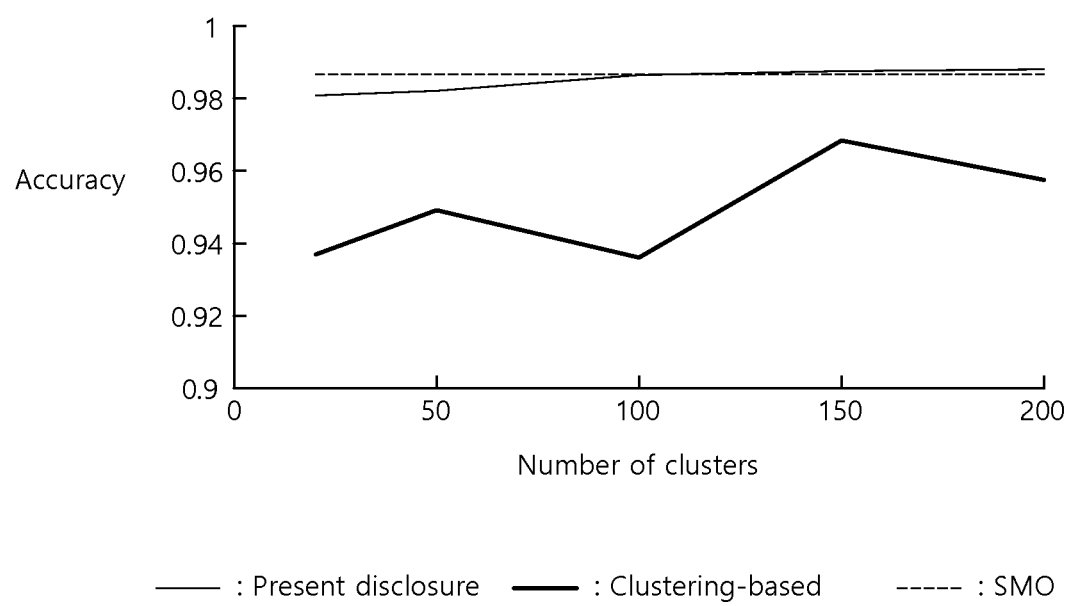
Figure 26:
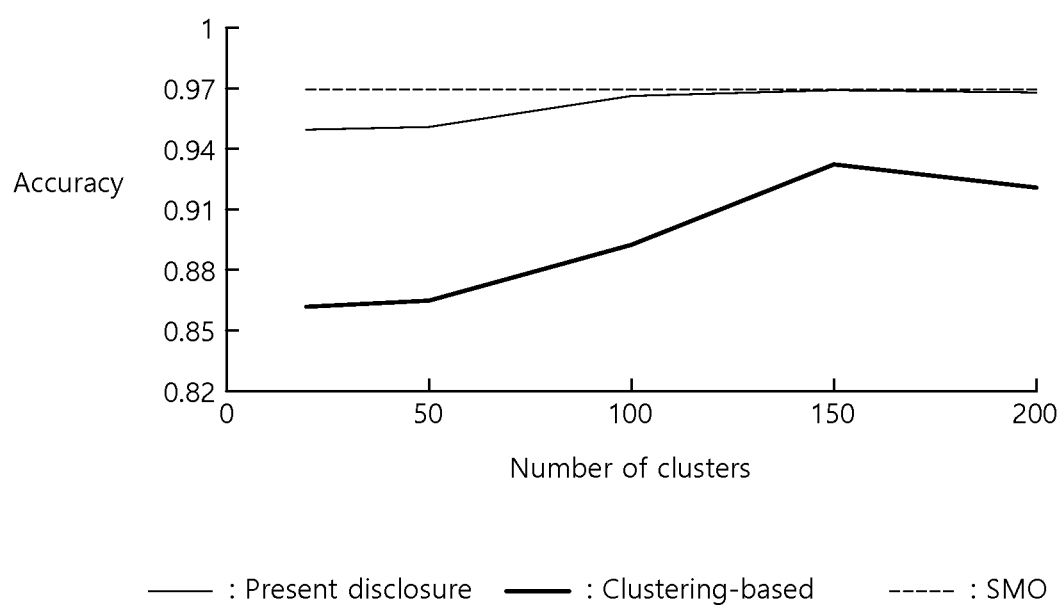

FIGS. 17 and 18 illustrate comparison of training times and classification accuracies for a banana data set according to one embodiment of the present disclosure and conventional classification algorithms.

The banana data set is composed of 5300 samples of binary class labels. The SVC-CH method according to one embodiment of the present disclosure significantly outperforms the other two methods in terms of training time and provides very high accuracy. The simulation results with the banana data set indicate that the SVC-CH method according to one embodiment of the present disclosure is suitable even for a relatively small-scale data set.

FIGS. 19 to 22 illustrate comparison of training times for artificial data sets according to one embodiment of the present disclosure and conventional classification algorithms.

FIGS. 19 to 22 show comparison of training times for multi-class data sets of 50000, 100000, 200000, and 400000 data points, respectively.

FIGS. 23 to 26 illustrate comparison of classification accuracies for artificial data sets according to one embodiment of the present disclosure and conventional classification algorithms.

FIGS. 23 to 26 show comparison of classification accuracies for multi-class data set of 50000, 100000, 200000, and 400000 data points, respectively.

To evaluate the performance of the SVC-CH method according to one embodiment of the present disclosure, multi-class data sets composed of 5000, 100000, 200000, and 400000 data points are used.

The simulation shows that the SVC-CH method according to one embodiment of the present disclosure exhibits the shortest training time compared with the conventional methods. Also, the SVC-CH method according to one embodiment of the present disclosure exhibits higher accuracy than the clustering-based and FDR-based algorithms. The accuracy obtained from the SVC-CH method according to one embodiment of the present disclosure is similar to that of the SMO algorithm, especially with a large number of clusters. The test with the artificial data sets indicates that as a larger number of training samples are used, the SVC-CH method according to one embodiment of the present disclosure is more efficient than the conventional methods.

Meanwhile, in a non-volatile computer-readable storage medium storing one or more programs that may be executed by a processor, provided may be a non-volatile computer-readable storage medium, the medium comprising commands that instruct the processor: to cluster data points into a plurality of clusters; construct a hyperplane by using a set of centroids of singular clusters having a single class label from the plurality of clusters and remove singular clusters whose centroids are not used to construct the hyperplane; generate a convex hull for a singular cluster used to construct the hyperplane; remove internal data points except for the vertices of the generated convex hull from the singular cluster whose centroid is used to construct the hyperplane; and classify a set of remaining data points except for the removed internal data points among the plurality of clusters when the one or more programs are executed by the processor.

Meanwhile, according to one embodiment of the present disclosure, various embodiments described above may be implemented by software that includes commands stored in a machine (for example, a computer)-readable storage medium. The machine is an apparatus capable of calling stored commands from the storage medium and operating according to the commands called, which may include an electronic device (for example, an electronic device (A)) according to the disclosed embodiments. When a command is executed by the processor, the processor may perform the function corresponding to the command directly or by using other constituting elements under the control of the processor. The command may include code generated or executed by a compiler or an interpreter. The machine-readable storage medium may be provided in the form of a non-transitory storage medium. Here, the term "non-transitory" only indicates that the storage medium does not include a signal and is tangible but does not distinguish whether data are stored semi-permanently or temporarily.

Also, according to one embodiment of the present disclosure, the method according to various embodiments descried above may be provided by being included in a computer program product. The computer program product may be traded between sellers and buyers as a commodity. The computer program product may be distributed in the form of a machine-readable storage medium (for example, a Compact Disc Read Only Memory (CD-ROM)) or online through an application store (for example, Play Store™). In the case of online distribution, at least part of the computer program product may be at least stored temporarily or generated temporarily in a server of the manufacturer, a server of the application store, or a storage medium such as a memory of a relay server.

Also, according to one embodiment of the present disclosure, various embodiments described above may be implemented in a recording medium that may be read by a computer or a machine similar thereto by using software, hardware, or a combination of both. In some cases, the embodiments of the present disclosure may be implemented within a processor itself. In the case of software implementation, the embodiments such as procedures and functions according to the present disclosure may be implemented by separate software modules. Each of the software modules may perform one or more functions and operations according to the present disclosure.

The computer instructions for executing processing operations of the machine according to various embodiments described above may be stored in a non-transitory computer-readable medium. When executed by a processor of a specific machine, the computer instructions stored in the non-transitory computer-readable medium command the specific machine to perform processing operations for an apparatus according to the various embodiments described above. The non-transitory computer-readable medium refers to a medium that stores data semi-permanently and that may be read by a machine, rather than a medium that stores data for a short time period such as a register, a cache, and a memory. Specific examples of the non-transitory computer-readable medium include a CD, a DVD, a hard disk, a Blu-ray disk, a USB memory, a memory card, and a ROM.

Also, each of the constituting elements (for example, a module or a program) according to the various embodiments of the present disclosure may be composed of a single or multiple entities; and part of the corresponding sub-elements described above may be omitted, or another sub-element may be further included in the various embodiments. Alternatively or additionally, part of the constituting elements (for example, a module or a program) may be integrated into a single entity, and the functions executed by the respective constituting elements prior to the integration may be performed in the same manner or in a similar manner. The operations executed by a module, a program, or another constituting element according to the various embodiments may be performed in a sequential, parallel, or heuristic manner; or at least part of the operations may be performed in a different order or omitted, or another operation may be added to the operations.

In the above, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

The present disclosure may provide the following effects. However, since it is not meant that a specific embodiment has to provide all of or only the following effects, the technical scope of the present disclosure should not be regarded as being limited by the specific embodiment.

The embodiments of the present disclosure may classify a large-scale data set in an efficient manner, thereby reducing training time considerably.

The embodiments of the present disclosure may combine support vector clusters and convex hulls to reduce the training time of an SVM in two phases, thereby removing duplicate training data in an effective manner.

Compared with conventional techniques developed, the embodiments of the present disclosure may provide an effect of reducing the training time distinguished from the conventional clustering-based training data reduction techniques while achieving higher classification accuracy.

What is claimed is:

1. A processor-implemented method for classifying data points using convex hulls based on centroids of clusters in a data point classification apparatus comprising at least a memory and a processor, the method comprising:
   clustering, by the processor, data points into a plurality of clusters;
   constructing, by the processor, a hyperplane by using a set of centroids of singular clusters having a single class label from the plurality of clusters;
   removing, by the processor, singular clusters whose centroids are not used to construct the hyperplane;
   generating, by the processor, a convex hull for each singular cluster used to construct the hyperplane;
   removing, by the processor, internal data points except for vertices of the generated convex hull from the each singular cluster whose centroid is used to construct the hyperplane; and
   classifying, by the processor, remaining data points,
   wherein the remaining data points are data points excluding the data points of the removed singular clusters and the internal data points of the remaining singular clusters, from all clustered data points.

2. The method of claim 1, wherein the clustering of the data points includes dividing the data points into a plurality of clusters by using a K-means clustering algorithm.

3. The method of claim 1, wherein a number of the plurality of clusters is chosen based on a number of data points and a structure of a data set composed of the data points.

4. The method of claim 1, wherein the plurality of clusters include at least one singular cluster having a single class label and at least one mix cluster having multiple class labels.

5. The method of claim 1, wherein the removing of the singular clusters includes:
   constructing the hyperplane by applying a Support Vector Machine (SVM) to a set of centroids of the singular clusters; and
   setting the centroids used to construct the hyperplane as support vectors.

6. The method of claim 1, wherein the generating of the convex hull includes generating the convex hull for each singular cluster by using a Quickhull algorithm.

7. The method of claim 1, wherein the removing of the internal data points includes:
   selecting vertices of the generated convex hull from the data points of each singular cluster whose centroid is used to construct the hyperplane; and
   removing the internal data points located inside the selected vertices of the generated convex hull.

8. The method of claim 1, wherein the removing of the internal data points includes selecting respective vertices of the generated convex hull for each singular cluster whose centroid is used to construct the hyperplane.

9. The method of claim 1, wherein the remaining data points are constructed by combining vertices of the generated convex hull from the data points of each singular cluster and data points of a mix cluster having multiple class labels from the plurality of clusters.

10. The method of claim 1, wherein the classifying of the remaining data points includes classifying the remaining data points by applying SVM to the remaining data points.

11. An apparatus for classifying data points using convex hulls based on centroids of clusters, the apparatus comprising:
   a memory storing one or more programs; and
   a processor executing the one or more stored programs, wherein the processor is configured to:
   cluster data points into a plurality of clusters;
   construct a hyperplane by using a set of centroids of singular clusters having a single class label from the plurality of clusters;
   remove singular clusters whose centroids are not used to construct the hyperplane;
   generate a convex hull for each singular cluster used to construct the hyperplane;
   remove internal data points except for vertices of the generated convex hull from each singular cluster whose centroid is used to construct the hyperplane; and
   classify remaining data points,
   wherein the remaining data points are data points excluding the data points of the removed singular clusters and the internal data points of the remaining singular clusters, from all clustered data points.

12. The apparatus of claim 11, wherein the processor is configured to classify the data points into a plurality of clusters by using a K-means clustering algorithm.

13. The apparatus of claim 11, wherein a number of the plurality of clusters is chosen based on a number of data points and a structure of a data set composed of the data points.

14. The apparatus of claim 11, wherein the plurality of clusters include at least one singular cluster having a single class label and at least one mix cluster having multiple class labels.

15. The apparatus of claim 11, wherein the processor is configured to:
   construct the hyperplane by applying a Support Vector Machine (SVM) to a set of centroids of the singular clusters; and
   set the centroids used to construct the hyperplane as support vectors.

16. The apparatus of claim 11, wherein the processor is configured to generate the convex hull for each singular cluster by using a Quickhull algorithm.

17. The apparatus of claim 11, wherein the processor is configured to:
   select vertices of the generated convex hull from the data points of each singular cluster whose centroid is used to construct the hyperplane; and
   remove the internal data points located inside the selected vertices of the generated convex hull.

18. The apparatus of claim 11, wherein the processor is configured to select respective vertices of the generated convex hull for each singular cluster whose centroid is used to construct the hyperplane.

19. The apparatus of claim 11, wherein the remaining data points are constructed by combining vertices of the generated convex hull from the data points of each singular cluster and data points of a mix cluster having multiple class labels from the plurality of clusters.

20. The apparatus of claim 11, wherein the processor is configured to classify the remaining data points by applying a Support Vector Machine (SVM) to the remaining data points.

* * * * *